Jan. 31, 1967   J. W. KOSINSKI   3,301,082
BALL SCREW MECHANISM
Filed June 16, 1964   3 Sheets-Sheet 1

Inventor
Joseph W. Kosinski
By Brown, Jackson,
Boettcher & Dienner Att'ys.

Inventor
Joseph W. Kosinski
By Brown, Jackson,
Boettcher & Dienner Att'ys.

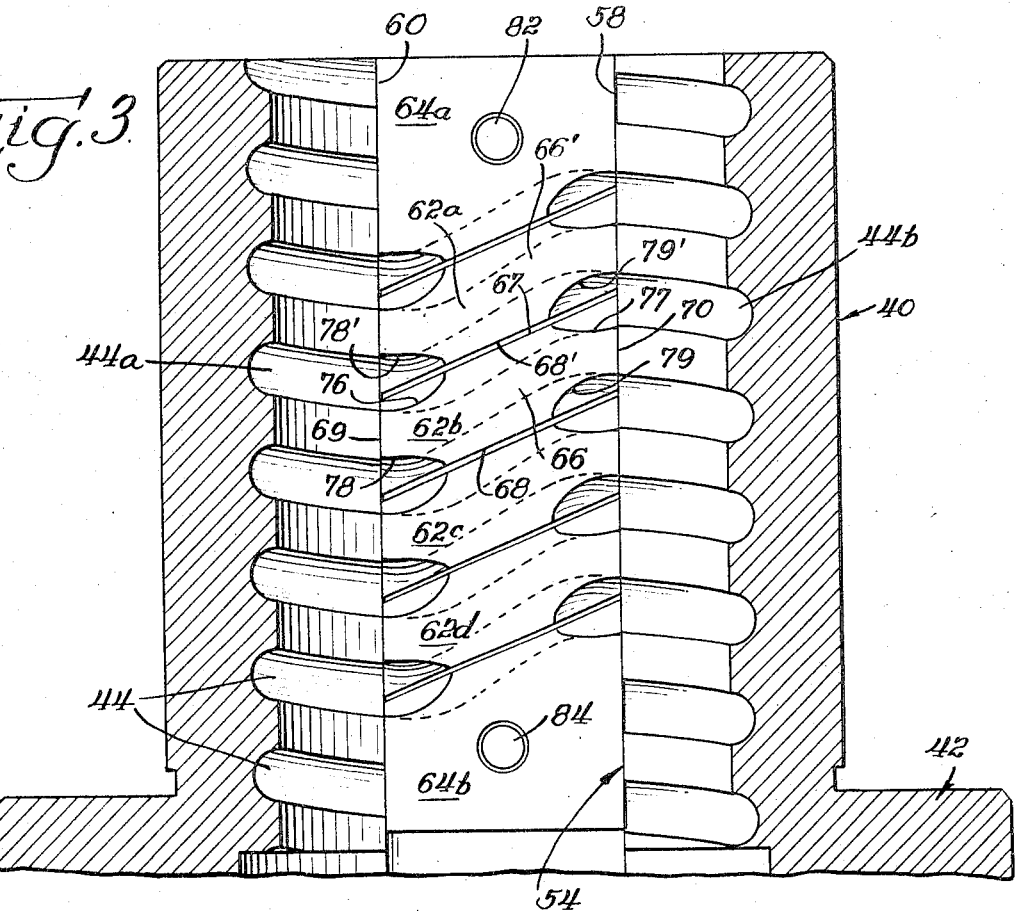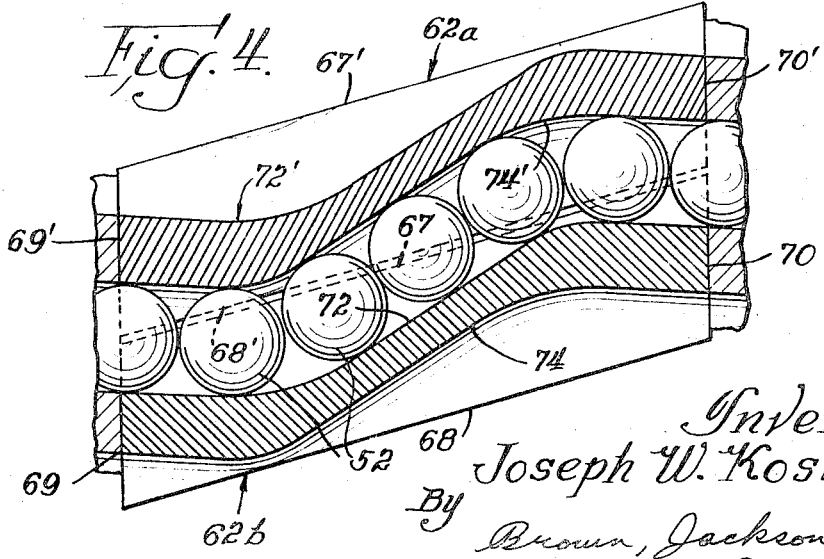

3,301,082
BALL SCREW MECHANISM
Joseph W. Kosinski, Riverside, Ill., assignor, by mesne assignments, to Scully-Jones and Company, a corporation of Delaware
Filed June 16, 1964, Ser. No. 375,446
10 Claims. (Cl. 74—424.8)

The present invention relates to a recirculating ball screw, and in particular to improved ball return or crossover means to permit recirculation of a train of balls from one portion of a helical passage to another portion thereof to provide a closed circuit for the balls.

It is well known in the art to provide a ball screw mechanism wherein complementary helical grooves are formed on a ball screw and in a corresponding ball nut to provide between them a helical passage in which an endless series of balls is circulated for interconnecting the screw and nut members. Such ball screw mechanisms find extensive use in applications where it is desired to convert rotary motion to linear motion or vice versa with a minimum of friction and wear.

In such ball screw mechanisms, it is necessary to provide return means to transfer the plurality of balls from one portion of the helical passage over an intervening crest to another portion thereof so as to permit continuous recirculation of a train of balls. Commonly, a train of balls is adapted to recirculate in a helical passage of approximately one convolution, although a plurality of such independent trains of balls may be provided. In order to return the balls from one end of the helical passage to the other, various types of return or crossover passages have been proposed. A ball return passage for a ball screw may be formed in the screw member or in the nut member, or a ball return may be mounted externally of the nut.

One of the principal disadvantages of the ball screw mechanisms heretofore known is that they are difficult and expensive to manufacture, particularly due to the complexity of the ball return or crossover members. Another problem has been the difficulty in causing the balls to move freely and in a smooth manner as they pass out of a loaded zone into the ball return and then back into a loaded zone.

It is therefore one object of the present invention to provide a ball screw mechanism having a ball return member which permits an unusually smooth and free flow of a plurality of balls from a loaded zone in a helical passage formed by mating grooves on a screw and a nut member into the return member and from the return member back into the loaded zone.

Another object of the invention is to provide a ball screw mechanism which is unusually simple and inexpensive to manufacture and assemble.

In furtherance of the foregoing objects, a preferred embodiment of the present invention comprises a ball nut member having a longitudinal slot formed internally therein so as to extend substantially the full length of the nut member. The ball return or crossover means is disposed in the longitudinal slot and comprises a plurality of ball return inserts which are positioned generally transversely in side-by-side relation in the slot. Each ball return insert has a portion of a crossover groove formed in opposite sides thereof whereby when the several inserts are disposed in side-by-side relation, each groove portion cooperates with an adjacent complementary groove portion to define a crossover groove for a corresponding train of balls. The groove portions formed in the sides of the inserts may be formed beneath the surface thereof so that when the inserts are operatively positioned in the longitudinal slot the resulting grooves will be substantially closed to maintain the balls out of contact with the intervening screw crest. A further important feature of the present invention is that the several ball return inserts which form the crossover grooves comprise individual members which are disposed somewhat loosely in the longitudinal slot of the nut so as to leave a clearance therein thus permitting slight axial and radial movements of the inserts when they are engaged by the balls entering and leaving the crossover grooves. Thus, when the inserts are positioned side-by-side in the longitudinal slot, their total length in the longitudinal direction is less than the length of the slot in which they are disposed, thereby permitting the inserts to float or shift their position longitudinally, i.e., in a direction parallel to the axis of the ball screw. In addition, there is a clearance provided between the outer diameter of the screw member and the radially inner surfaces of the ball return inserts which face such screw member, thereby permitting radial as well as axial floating of the ball return insert members. In accordance with the foregoing feature, the ball return members are automatically aligned axially and radially when engaged by the balls so as to provide a minimum of resistance to smooth flow of the train of balls through the return, and the continuous presence of a plurality of balls in the crossover grooves will retain the ball return inserts within the slot in the ball nut.

The foregoing and other objects and advantages of the invention will be apparent from the following description thereof.

Now in order to acquaint those skilled in the art with the manner of utilizing and practicing my invention, I shall describe, in conjunction with the accompanying drawings, certain preferred embodiments of the invention.

In the drawings:

FIGURE 3 is a longitudinal sectional view, partly broken away, taken substantially along the line 3—3 of FIGURE 2, but with the screw member removed so as to illustrate the ball return inserts disposed side-by-side in a longitudinal slot formed in the ball nut member;

FIGURE 4 is an enlarged fragmentary sectional view, taken approximately along the line 4—4 of FIGURE 2, showing the manner in which the balls pass through a crossover groove defined by adjacent complementary groove portions formed in the sides of a pair of side-by-side ball return inserts;

Figure 1:
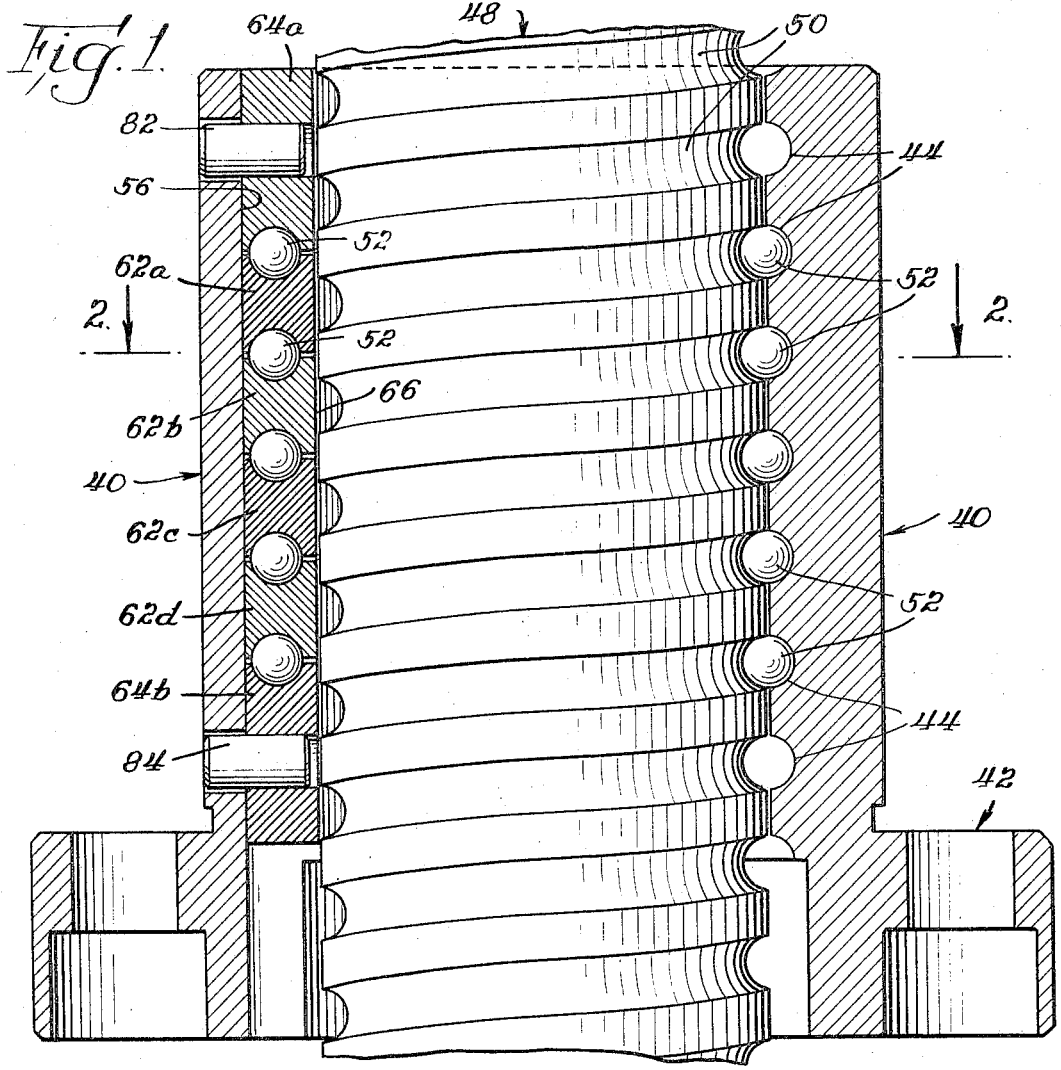
FIGURE 1 is a longitudinal sectional view, taken substantially along the line 1—1 of FIGURE 2, showing a ball screw mechanism equipped with the ball return means of the present invention.
Figure 8:
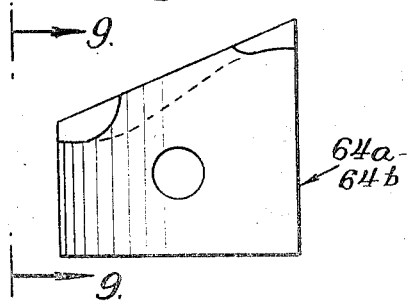
FIGURE 8 is a top plan view of a ball return insert comprising one of the end pieces which are mounted in the end portions of the longitudinal slot in the ball nut member, such end piece having a groove portion formed in one side thereof only.
Figure 9:
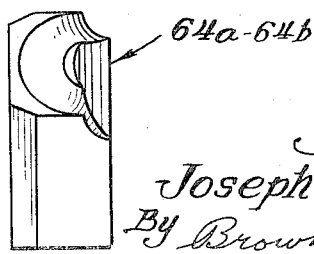
FIGURE 9 is an end view of the ball return insert of FIGURE 8 looking substantially in the direction of the arrows 9—9 of FIGURE 8.

Referring now to the drawings, FIGURE 1 shows a ball nut 40 having an apertured flange 42 at one end thereof for mounting the same to any desired support. It will be seen that the ball nut 40 has an internal helical groove 44 formed therein and a screw 48 extends axially through the nut member 40 and has an external helical groove 50 formed thereon. The screw groove 50 together with the groove 44 in the nut member defines a plurality of helical passages for trains of balls 52 which interconnect the screw and nut members.

Figure 2:
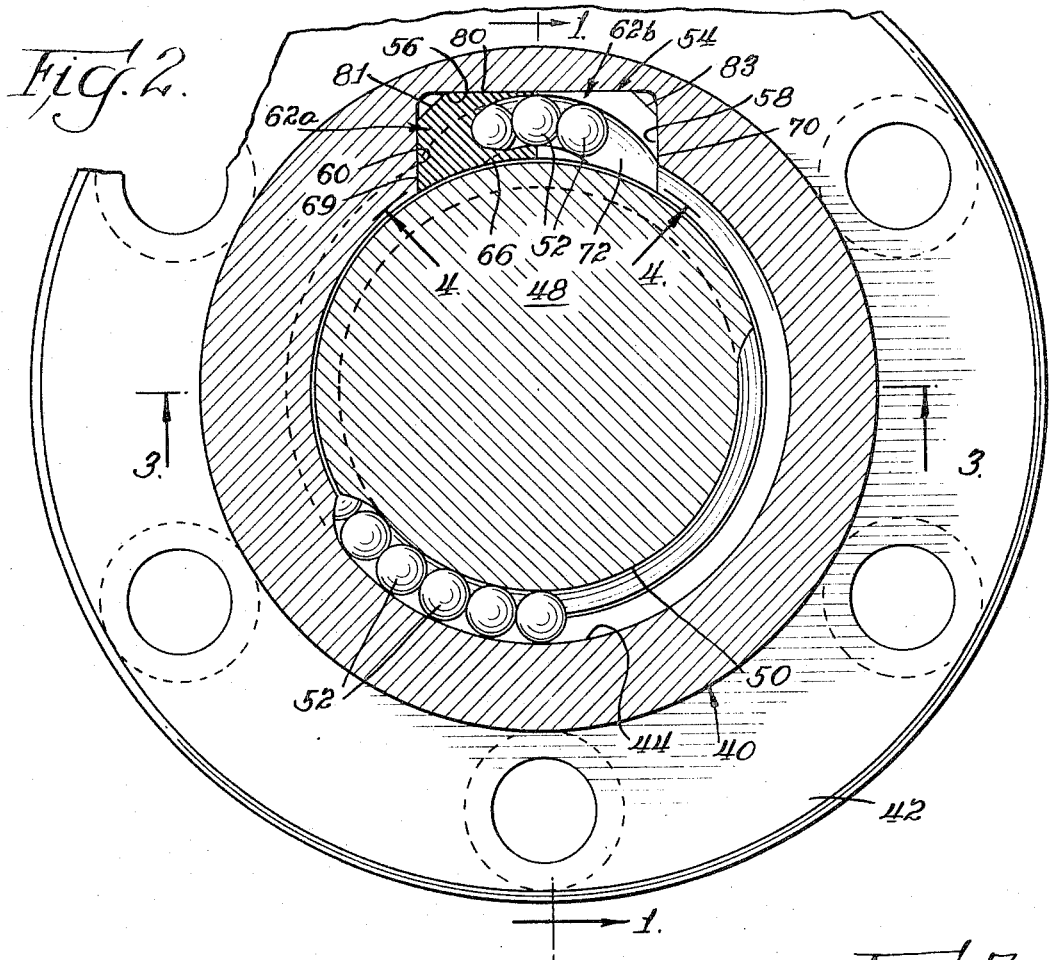
FIGURE 2 is a transverse sectional view, partly broken away, taken substantially along the line 2—2 of FIGURE 1.

As shown in FIGURES 2 and 3, a longitudinal slot or keyway 54 is formed in the inside of the ball nut 40 and extends the full length thereof. The slot 54 comprises a bottom wall 56 and oppositely disposed side walls 58 and 60, and in the embodiment being described six ball return inserts are disposed in the slot 54 in order to provide crossover grooves which together with the helical passages defined by the nut groove 44 and the screw groove 50 comprise a plurality of closed circuits for respective trains of balls 52.

Figure 5:
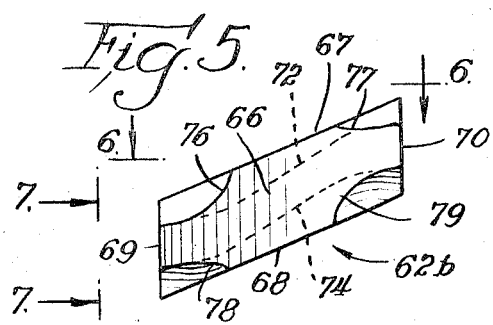
FIGURE 5 is a detail top plan view of a ball return insert showing what comprises the radially inner portion of the insert when the latter is mounted in a ball nut member.
Figure 7:
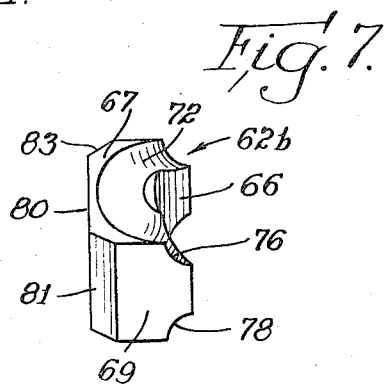
FIGURE 7 is an end view of the ball return insert looking substantially in the direction of the arrows 7—7 of FIGURE 5.
Figure 6:
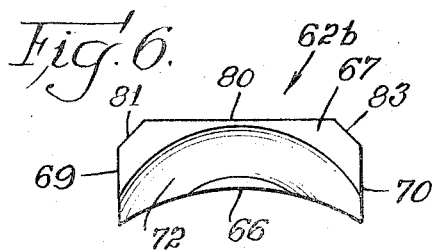
FIGURE 6 is a side elevational view of the ball return insert looking substantially in the direction of the arrows 6—6 of FIGURE 5.

There are shown four substantially identical center ball return insert members 62a, 62b, 62c and 62d, and in addition two substantially identical end insert members 64a and 64b which are mounted at the opposite ends of the slot 54. FIGURES 5–7 are detail views of the center ball return insert 62b, and as there shown the insert comprises a concave top wall 66, a pair of substantially parallel sides 67 and 68, and a pair of substantailly parallel end walls 69 and 70. A groove portion 72 is formed in the side 67 of the insert, and a complementary groove portion 74 is formed in the opposite side 68. The respective depths of the groove portions 72 and 74 are best shown in FIGURE 4 which also shows the adjacent insert 62a having a groove portion 74' substantially identical to the groove portion 74. In addition, a longitudinal side 68' of the insert 62a is shown adjacent but slightly spaced from the side 67 of the insert 62b.

It will be understood from the foregoing that each of the several inserts 62a, 62b, 62c and 62d are substantially identical, and where two inserts such as 62a and 62b are arranged side-by-side as shown in FIGURE 4, the groove portion 72 in the insert 62b and the adjacent groove portion 74' in the insert 62a together define a crossover groove for a train of balls 52. In any one of the inserts such as the insert 62b, where the groove portion 72 on one side is deeper, the opposite groove portion 74 on the other side is of proportionately reduced depth, whereby when the inserts are arranged in combination they provide a plurality of crossover passages or grooves which are generally constant in their cross section and follow a path which resembles a somewhat flattened S-shape in its configuration.

Still referring to FIGURES 5, the concave face 66 is relieved at its four corners as at 76, 77, 78 and 79 to expose the end portions of the grooves 72 and 74 and thereby define openings for the balls 52 to enter and leave the crossover grooves when the inserts are assembled in the longitudinal slot 54. Thus, when the insert 62a is disposed adjacent the insert 62b as shown in FIGURE 3, the relief 76 on the insert 62b cooperates with a relief 78' on the insert 62a to form an entrance-exit opening at one end of the crossover groove defined between such inserts, and the relief 77 on the insert 62b cooperates with a relief 79' on the insert 62a to form an entrance-exit opening at the opposite end of the crossover groove. It will also be noted that one edge 67 of the concave surface 66 of the insert 62b approximately engages the adjacent edge 68' of the concave surface 66' of the insert 62a so that the crossover passage defined by such inserts is substantially closed and the balls 52 as they pass therethrough are thus maintained out of contact with the intervening crest on the screw 48.

FIGURES 6 and 7 further show a flat bottom wall 80 on the ball return insert 62b, the wall 80 being bevelled at its ends at 81 and 83. When the insert is mounted in the longitudinal slot 54 in the nut 40, it is disposed so that the bottom wall 80 of the insert rests on the bottom wall 56 of the slot, and thus the concave wall 66 faces radially inwardly toward the screw 48. It will also be noted from FIGURE 3 that the ball return inserts are disposed in the longitudinal slot 54 with the end walls 69 and 70 parallel to the side walls 58 and 60 of the slot, whereby the crossover grooves defined by the inserts are inclined so as to connect the opposite ends of approximately one convolution of the nut groove 44 thereby to provide a closed circuit for a train of balls. For example, the crossover groove defined by the inserts 62a and 62b connects the portions 44a and 44b of the nut groove 44 to provide a closed circuit comprising the crossover passage and slightly less than one convolution of the helical nut groove 44.

It will now be understood that a crossover passage is defined between each of the several ball return inserts, and each such crossover passage cooperates with slightly less than one convolution of the mating helical nut groove 44 and screw groove 50 to define a separate closed circuit for a train of the balls 52. Thus, the ball nut 40 as shown in FIGURE 3 is equipped to provide five independent trans of balls for interconnecting the nut with the screw 48. It will be noted that in the embodiment being described the end inserts 64a and 64b, while substantially identical to each other, are of a different construction than the center inserts. As shown in the drawings, the end inserts each have a groove portion formed in only one side thereof, and they are somewhat longer than the center inserts in the direction of the length of the slot 54. However, it is possible where desired to use the center inserts 62 throughout, in which case one of the groove portions in the inserts disposed at the ends of the slot will be inoperative.

Referring now to FIGURES 1 and 3, the end insert 64a is disposed in the longitudinal slot 54 at one end thereof and is fixed in position by means of a pin 82 which extends through the insert and into the wall of the nut 40. Clearance is provided between the pin 82 and the wall of the nut 40 in order to permit the insert 64a to float axially and radially as described earlier herein. In a similar fashion, the insert 64b is disposed in the opposite end of the slot 54 and is secured therein by a pin 84 which extends through the insert and into the wall of the nut, with clearance being provided to permit movement of the pin in the wall of the nut. Thus, the end inserts 64a and 64b and the several center inserts 62a, 62b, 62c and 62d are not fixed to the nut but are somewhat loosely disposed side-by-side in the slot 54. In addition, clearance is provided between the outer diameter of the screw 48 and the radially inner surfaces 66 of the inserts so as to permit the latter to float radially as well as axially. In this respect, it is important to understand that when the ball screw mechanism is filled with the balls 52, the loosely disposed inserts 62 will be held in the slot 54 by the balls in the various crossover passages. For example, in assembling the inserts 62 they are simply positioned in the slot 54 in closely adjacent relation to one another, and thereafter the crossover passages defined between the inserts may be filled with the balls 52. The balls themselves through engagement with the inserts at the groove portions thereof will prevent the inserts from being removed from the slot, and such removal can thus be effected only after the balls are first removed from the crossover passages.

It is a feature of the present invention that the inserts 62a, 62b, 62c and 62d and the end inserts 64a and 64b are dimensioned to fit somewhat loosely in the slot 54 so that they are capable of slight movements in an axial direction, i.e., in the direction of the length of the slot, and also in a radial direction. Accordingly, when the ball screw mechanism is in operation, the balls 52 as they enter or leave the crossover passages can through engagement with the inserts cause them to shift slightly axially or radially. Thus, the inserts can be automatically aligned to a limited extent so as to adjust their position in accordance with the movement of the balls and thereby provide a minimum of resistance to the smooth flow of the balls through the inserts.

It will be seen that the foregoing structure is adapted to accomplish the objects stated earlier herein. The inserts are held in the slot by the balls themselves and yet can be shifted axially and radially by the balls to align them and thereby minimize resistance to the smooth flow of the train of balls. In addition, the structure of the present invention is unusually simple and inexpensive to manufacture and assemble. The slot 54 can be formed in the wall of the ball nut by a simple broaching operation, and the inserts are adapted to be manufactured by simple molding operations. The need for complex molding operations or for complex machining operations to form interior crossover passages is eliminated by the structure of the present invention. The device can be assembled by mounting the end inserts 64 by means of the pins 82 and 84, positioning the center inserts in the slot 54, filling the crossover passages with balls 52, and then filling the various helical passages, with balls as the screw 48 is rotated relative to the nut. In addition, each convolution of the helical passage has its own independent crossover member to provide a closed circuit, and the several independent trains of balls may operate in adjacent closed circuits so that the screw and nut members may interact with one another throughout substantially their entire length.

While I have described my invention in a preferred form, I do not intend to be limited to that form except insofar as the appended claims are so limited, since modifications coming within the scope of the invention will readily occur to those skilled in the art, particularly with my disclosure before them.

I claim:

1. A ball screw mechanism comprising, in combination a first member comprising a ball screw, a second member comprising a ball nut surrounding said ball screw, said first and second members having mating helical grooves to define helical passages therebetween for trains of balls for interconnecting said first and second members, a longitudinal slot in one of said first and second members disposed to face the other of said members and interrupt said helical passages, and a plurality of individual ball return inserts mounted in said longitudinal slot, said ball return inserts having complementary groove portions formed in opposite sides thereof, and said inserts being arranged side-by-side in said slot whereby complementary groove portions in adjacent inserts will cooperate to define a crossover passage to connect opposite ends of a corresponding helical passage to provide a closed circuit for a train of balls.

2. A ball screw mechanism comprising, in combination, a first member comprising a ball screw, a second member comprising a ball nut surrounding said ball screw, said first and second members having mating helical grooves to define helical passages therebetween for trains of balls for interconnecting said first and second members, a longitudinal slot in one of said first and second members disposed to face the other of said members and interrupt said helical passages, and a plurality of individual ball return inserts having complementary groove portions formed in opposite sides thereof, said inserts being arranged side-by-side in said slot whereby complementary groove portions in adjacent inserts will cooperate to define a crossover passage to connect opposite ends of a corresponding helical passage to provide a closed circuit for a train of balls, and said ball return inserts being sufficiently loosely disposed in said slot to permit slight axial movement therein whereby as said balls engage said inserts the latter are capable of being moved axially thereby to improve their alignment and minimize resistance to movement of the balls therethrough.

3. The invention of claim 2 wherein said complementary groove portions formed in opposite sides of said ball return inserts are spaced from the top surfaces of said inserts whereby when said inserts are disposed side-by-side in closely adjacent relation in said slot said top surfaces will approximately engage so as to substantially close the crossover passages defined by said groove portions whereby when said balls pass through said crossover passages they will be maintained out of contact with the intervening crest on the one of said first and second members facing said longitudinal slot.

4. The invention of claim 3 wherein the longitudinal slot is formed internally in said ball nut member and wherein said top surfaces of said ball return inserts are concave and are disposed radially inwardly so as to face said screw member, said crossover passages being adapted to maintain the balls therein out of contact with the corresponding intervening screw crest.

5. A ball screw mechanism comprising, in combination, a ball screw member, a ball nut member surrounding said ball screw, said screw and nut members having mating helical grooves to define helical passages therebetween for trains of balls for interconnecting said screw and nut members, an internal longitudinal slot formed in said ball nut member so as to interrupt said helical passages, and a plurality of individual ball return inserts having complementary groove portions formed in opposite sides thereof, said inserts being arranged side-by-side in said slot whereby complementary groove portions in adjacent inserts will cooperate to define a crossover passage to connect opposite ends of a corresponding helical passage to provide a closed circuit for a train of balls, and said ball return inserts being sufficiently loosely disposed in said slot to permit slight axial movement therein whereby as said balls engage said inserts the latter are capable of being moved axially thereby to improve their alignment and minimize resistance to movement of the balls therethrough.

6. A ball screw mechanism comprising, in combination, a first member comprising a ball screw, a second member comprising a ball nut surrounding said ball screw, said first and second members having mating helical grooves to define helical passages therebetween for trains of balls for interconnecting said first and second members, a longitudinal slot in one of said first and second members disposed to face the other of said members and interrupt said helical passages, a pair of ball return end insert members fixedly mounted in opposite ends of said slot, and a plurality of individual ball return center insert members mounted in said slot between said end inserts, said end and center insert members defining crossover passages to connect opposite ends of a corresponding helical passage to provide a closed circuit for a train of balls, and said ball return center inserts being sufficiently loosely disposed in said slot to permit slight axial movement therein whereby as said balls engage said inserts the latter are capable of being moved axially thereby to improve their alignment and minimize resistance to movement of the balls therethrough.

7. A ball screw mechanism comprising, in combination a first member comprising a ball screw, a second member comprising a ball nut surrounding said ball screw, said first and second members having mating helical grooves to define helical passages therebetween for trains of balls for interconnecting said first and second members, a longitudinal slot in one of said first and second members disposed to face the other of said members and interrupt said helical passages, a pair of ball return end insert members fixedly mounted in opposite ends of said slot, said end insert members each having a groove portion formed on the axially inner side thereof, and a plurality of individual ball return center insert members having complementary groove portions formed in opposite sides thereof, said center inserts being arranged side-by-side in said slot between said end inserts whereby complementary groove portions in adjacent inserts will cooperate to define a crossover passage to connect opposite ends of a corresponding helical passage to provide a closed circuit for a train of balls, and said center ball return inserts being sufficiently loosely disposed in said slot to permit slight axial movement therein whereby as said balls engage said inserts the latter are capable of being moved axially thereby to improve their alignment and minimize resistance to movement of the balls therethrough.

8. A ball screw mechanism comprising, in combination a ball screw member, a ball nut member surrounding said ball screw, said screw and nut members having mating helical grooves to define helical passages therebetween for trains of balls for interconnecting said screw and nut members, an internal longitudinal slot formed in said ball nut member so as to interrupt said helical passages, a pair of ball return end insert members fixedly mounted in opposite ends of said slot, said end insert members each having a groove portion formed on the axially inner side thereof, and a plurality of individual ball return center insert members having complementary groove portions formed in opposite sides thereof, said center inserts being arranged side-by-side in said slot between said end inserts whereby complementary groove portions in adjacent inserts will cooperate to define a crossover passage to connect opposite ends of a corresponding helical passage to provide a closed circuit for a train of balls, and said center ball return inserts being sufficiently loosely disposed in said slot to permit slight axial movement therein whereby as said balls engage said inserts the latter are capable of being moved axially thereby to improve their alignment and minimize resistance to movement of the balls therethrough.

9. In a ball screw mechanism of the type having a ball screw member and a ball nut member each having helical grooves to define helical passages therebetween for trains of balls for interconnecting said members and with a longitudinal slot in one of said members disposed to face the other of said members and interrupt said helical passages, the improvement comprising a plurality of individual ball return inserts having complementary groove portions formed in opposite sides thereof, said inserts being arranged side-by-side in said slot whereby complementary groove portions in adjacent inserts will cooperate to define a crossover passage to connect opposite ends of a corresponding helical passage to provide a closed circuit for a train of balls, and said ball return inserts being sufficiently loosely disposed in said slot to permit slight axial movement therein whereby as said balls engage said inserts the latter are capable of being moved axially thereby to improve their alignment and minimize resistance to movement of the balls therethrough.

10. In a ball screw mechanism of the type having a ball screw member and a ball nut member each having helical grooves to define helical passages therebetween for trains of balls for interconnecting said members and with a longitudinal slot in one of said members disposed to face the other of said members and interrupt said helical passages, the improvement comprising, in combination, a pair of ball return end insert members fixedly mounted in opposite ends of said slot, said end insert members each having a groove portion formed on the axially inner side thereof, and a plurality of individual ball return center insert members having complementary groove portions formed in opposite sides thereof, said center inserts being arranged side-by-side in said slot between said end inserts whereby complementary groove portions in adjacent inserts will cooperate to define a crossover passage to connect opposite ends of a corresponding helical passage to provide a closed circuit for a train of balls, and said center ball return inserts being sufficiently loosely disposed in said slot to permit slight axial movement therein whereby as said balls engage said inserts the latter are capable of being moved axially thereby to improve their alignment and minimize resistance to movement of the balls therethrough.

References Cited by the Examiner

UNITED STATES PATENTS

| | | | |
|---|---|---|---|
| 2,842,978 | 1/1956 | Orner | 74—459 |
| 2,851,897 | 3/1957 | Cochrane | 74—459 |
| 2,895,343 | 7/1959 | Orner | 74—459 |
| 2,924,113 | 2/1960 | Orner | 74—459 |

FOREIGN PATENTS 880,001  10/1961  Great Britain.

EDGAR W. GEOGHEGAN, *Primary Examiner.*

DAVID J. WILLIAMOWSKY, *Examiner.*

R. F. HESS, *Assistant Examiner.*